United States Patent
Wu et al.

(10) Patent No.: US 10,197,191 B2
(45) Date of Patent: Feb. 5, 2019

(54) PIPE RETAINING DEVICES

(71) Applicant: Ford Global Technologies LLC, Dearborn, MI (US)

(72) Inventors: Lawrence Wu, Nanjing (CN); Seven Qi, Nanjing (CN); Le Hong, Nanjing (CN); Ming Zhao, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/913,598

(22) Filed: Mar. 6, 2018

(65) Prior Publication Data

US 2018/0259093 A1     Sep. 13, 2018

(30) Foreign Application Priority Data

Mar. 8, 2017 (CN) .......................... 2017 1 0136226

(51) Int. Cl.
| | |
|---|---|
| *F16L 13/12* | (2006.01) |
| *F16L 3/12* | (2006.01) |
| *F16L 3/22* | (2006.01) |
| *F16L 3/237* | (2006.01) |

(52) U.S. Cl.
CPC ............ *F16L 3/1211* (2013.01); *F16L 3/221* (2013.01); *F16L 3/237* (2013.01)

(58) Field of Classification Search
CPC . F16L 3/1075; F16L 3/105; F16L 3/22; F16L 3/11; F16L 3/1211; F16L 3/237; F16L 3/221

USPC ...................... 248/49, 58, 62, 63, 68.1, 74.1
See application file for complete search history.

(56) References Cited

U.S. PATENT DOCUMENTS

| | | | | |
|---|---|---|---|---|
| 4,936,530 A | * | 6/1990 | Wollar | F16B 2/12 248/68.1 |
| 5,149,026 A | * | 9/1992 | Allen | F16L 3/227 248/68.1 |
| 9,067,557 B1 | * | 6/2015 | Aselage | B60R 21/206 |
| 2006/0031988 A1 | | 2/2006 | Morse | |
| 2010/0116947 A1 | * | 5/2010 | Winkler | F16L 3/06 248/73 |
| 2013/0240684 A1 | * | 9/2013 | Meyers | F16L 3/2235 248/74.1 |

FOREIGN PATENT DOCUMENTS

| | | |
|---|---|---|
| CN | 202868049 U | 4/2013 |
| CN | 203010021 U | 6/2013 |
| CN | 104180076 A | 12/2014 |
| DE | 3019303 A1 | 11/1981 |
| JP | 2012141031 A | 7/2012 |

* cited by examiner

*Primary Examiner* — Muhammad Ijaz
(74) *Attorney, Agent, or Firm* — Julia Voutyras; Mohr IP Law Solutions, PC

(57) ABSTRACT

A pipe retaining device comprises a base panel; a clamping member coupled to the base panel and including a flexible part; and an adjusting member disposed outside the clamping member. The adjusting member includes a plurality of retaining portions adjacent to the flexible part and is moveable relative to the clamping member such that the flexible part is selectively engaged with one of the retaining portions.

17 Claims, 6 Drawing Sheets

PIPE RETAINING DEVICES

RELATED APPLICATION

This application claims the benefit of Chinese Patent Application No. CN 201710136226.8, filed Mar. 8, 2017, the entire contents thereof being incorporated herein by reference.

FIELD

The present disclosure relates to pipe retaining devices, more particularly to pipe devices to hold pipes with different diameters.

BACKGROUND

A vehicle includes various cables to transmit signal and or pipes to deliver fluids such as fuels, coolants, heating fluids. A conventional pipe retaining device includes an opening for insertion and removal of a pipe and a cap clipped on a body of the pipe retaining device to sealing the opening. Such pipe retaining device is used for pipes having a certain diameter and for fixing a single pipe. Chinese patent application CN203010021U discloses a pipe clamp device for pipes with different diameters. The pipe clamp device includes a first pipe clamp and a second pipe clamp connected with the first pipe clamp. Each of the first pipe clamp and the second pipe clamp includes a pipe clamp body and an auxiliary body connected with one end of the pipe clamp body. A groove is formed at another end of the pipe clamp body. A plurality of continuous ratchets are formed on one side of the clamp groove, and a plurality of teeth matched with the ratchets are formed on the auxiliary body. By changing a depth that the auxiliary body is inserted into the groove, the position of the teeth relative to the ratchets can be adjusted such that a clamping area defined by the main and auxiliary bodies is changed to adapt pipes with different diameters. However, it can be difficult and time consuming to insert the pipes into the pipe clamp device and to adjust the retaining area. Thus, there is need for a pipe retaining device with simple structures and easy adjustment features.

SUMMARY

The present disclosure provides pipe retaining device to at least address some of the issues described above. The pipe retaining device has a simple structure and is easy for adjustment.

According to one aspect of the present disclosure, a pipe retaining device is provided. The pipe retaining device comprising a base panel; a clamping member coupled to the base panel and including a flexible part; and an adjusting member disposed outside the flexible part and coupled to the base panel. The adjusting member includes a plurality of retaining portions adjacent to the flexible part and is moveable relative to the clamping member such that the flexible part is selectively engaged with one of the retaining portions.

In some embodiments, the pipe retaining device may further comprises a guiding member disposed on a surface of the base panel and connected with the adjusting member. The adjusting member is configured to be moveable along the guiding member. The clamping member may include a first arm and a second arm having the flexible part, and a top of the first arm and a top of the second arm are spaced apart to create a gap for insertion and removal of a pipe. The first and second arms may define a substantial cylindrical shaped receiving portion to secure the pipe.

In some embodiments, the adjusting member may include a body, the retaining portions of the adjusting member are formed at a first side of the body and include a lower recess and an upper recess. The second arm may have a protrusion at a free end thereof to be engaged in the lower recess or the upper recess. The adjusting member may be configured to move downward along the guiding member such that the second arm moves towards the first arm and the protrusion of the second arm is released from the lower recess and engaged with the upper recess to decrease a cross-sectional area of the receiving portion.

In some embodiments, the adjusting member may be further configured to move upward along the guiding member such that the second arm moves away from the first arm and the protrusion of the second arm is released from the upper recess and engaged with the lower recess to increase the cross-sectional area of the receiving portion.

In some embodiments, the first side of the body is substantial vertical to the surface of the base panel, and the upper recess has a depth smaller than that of the lower recess.

In some embodiments, the first side of the body is configured to have an inclined surface and spaced further away from the second arm in an up to down direction, the upper recess has a depth substantially the same as that of the lower recess, and an opening of the upper recess is closer to the protrusion of the second arm than an opening of the lower recess.

In some embodiments, the first arm is flexible and integrally molded with the second arms.

In some embodiments, the first arm includes at least one first reinforcement rib at its inner surface or the second arm includes at least one second reinforcement rib at its inner surface In some embodiments, the pipe retaining device of further includes a connection portion disposed below the first or second arm to connect with the surface of the base panel.

In some embodiments, the pipe retaining device of further includes a support rib connected with the connection portion and extending between the clamping member and the base panel.

In some embodiments, the guiding member is configured to have a substantial cylindrical bar shape, and the adjusting member includes a substantial cylindrical chamber to receive the guiding member such that the adjusting member is able to move upward or downward along the bar under a force.

In some embodiments, the pipe retaining device of further includes a barrier block disposed on the surface of the base panel, and a second side of the body of the adjustment member opposite to the first side rests on a surface of the barrier block.

In some embodiments, the barrier block includes a slide rail on the surface, and the adjusting member includes a slide at the second side, and the slide is moveable along the side rail under a force.

According to another aspect of the present disclosure, a pipe retaining device is provided. The pipe retaining device comprises a base panel; a first clamping member having a flexible part and a second clamping member having a flexible part; and an adjusting member disposed between the first flexible part and the second flexible part. The first clamping member and the second clamping member are disposed on a surface of the base panel and spaced apart with each other. The adjusting member includes a plurality of first retaining portions formed in a first side of a body, and a plurality of second retaining portions formed in a second side of the body. An engagement between one of the first retaining portions and the first flexible part defines a first cross-section area of the first clamping member, and an engagement between one of the second retaining portions and the second flexible part defines a second cross-section area of the second clamping member.

In some embodiments, the pipe retaining device may further comprises a guiding member disposed on the surface of the base panel and moveably connected with the adjusting member. The first flexible part of the first clamping member changes the engagement with one of the first retaining portions of the adjusting member while the second flexible part of the second clamping member changes the engagement with one of the second retaining portions as the adjusting member moves along the guiding member.

In some embodiments, the first clamping member may include a first clamping arm and a second clamping arm that includes the first flexible part. A top of the first clamping arm and a top of the second clamping arm are spaced apart. A space between the first and second clamping arms defines a first receiving portion to receive a first pipe. The second clamping member may include a third clamping arm, and a fourth clamping arm that includes the second flexible part. A top of the third clamping arm and a top of the fourth clamping arm are spaced apart. A space between the third and fourth clamping arms defines a second receiving portion to receive a second pipe.

In some embodiments, the plurality of the first retaining portions of the adjusting member may comprise a first lower recess and a first upper recess. A free end of the second clamping arm may include a first protrusion. The adjusting member may be configured to move downward or upward along the guiding member to enable an engagement of the first protrusion with the first upper recess or the first lower recess, respectively, to vary the first cross-sectional area of the first receiving portion. The plurality of second retaining portions of the adjusting member may comprise a second lower recess and a second upper recess. A free end of the fourth clamping arm may include a second protrusion. The adjusting member may be configured to move downward or upward along the guiding member to enable an engagement of the second protrusion with the second lower recess or the second upper recess, respectively, to vary the second cross-sectional area of the second receiving portion.

According to yet another aspect of the present disclosure, a pipe retaining device is provided. The pipe retaining device comprises a base panel; a clamping member coupled with the base panel and including a gap for insertion and removal of a pipe, a receiving portion having a variable cross-section area; an adjusting member disposed outside a first side of the clamping member and having a first recess and a second recess formed on one side of a body; and a guiding member disposed on the base panel and coupled with the adjusting member such that the adjusting member is moveable along the guiding member. The second recess of the adjusting member has an edge more adjacent to the first side of the clamping member than an edge of the first recess. An end of the clamping member contacts with the first recess or the second recess to define a first cross-section area or a second cross-section area of the receiving portion, respectively.

In some embodiments, the first side of the clamping member includes a flexible part adjacent to the adjusting member and has a curved shape, and wherein the side of the body of the adjustment member has an inclined surface to guide the movement of the adjustment member relative to the clamping member.

In some embodiments, the adjusting member may further comprise a third recess having an edge more adjacent to the clamping member than the second recess.

The above advantages and other advantages, and features of the present description will be readily apparent from the following detailed description when taken alone or in connection with the accompanying drawings.

DETAILED DESCRIPTION

Embodiments of the present disclosure are described herein. It is to be understood, however, that the disclosed embodiments are merely examples and other alternative embodiments can take various forms. The figures are not necessarily to be drawn in scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
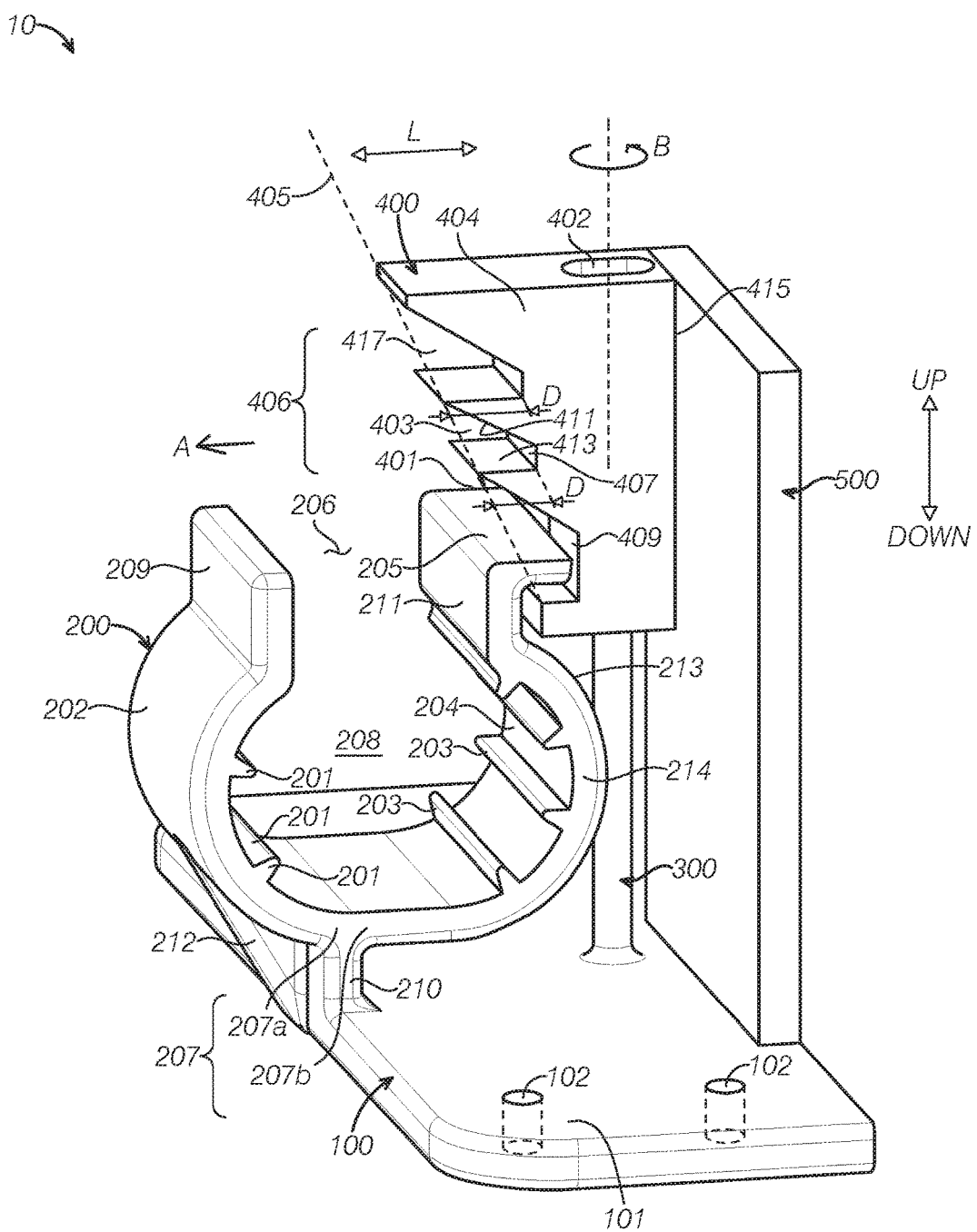
FIG. 1 is a perspective view of a pipe retaining device according to an embodiment of the present disclosure, illustrating the pipe retaining device in a first state.

With reference to FIG. 1, a pipe retaining device 10 according to an embodiment of the present disclosure is illustrated. The pipe retaining device 10 or retaining device 10 includes a base panel 100, a clamping member 200 and a guiding member 300 and an adjusting member 400. The clamping member 200 and the guiding member 300 are coupled to a surface 101 of the base panel 100 and opposing each other or spaced apart from each other. The adjusting member 400 is engaged with the clamping member 200 and movable along the guiding member 300 under a force.

In some embodiments, the base panel 100 may be a flat plate with any suitable shapes, such as a rectangle shape shown in FIG. 1. It should be appreciated that the base panel 100 may be any appropriate shapes such as a circle, a square, a polygon, or combinations thereof. The base panel 100 may have a shape or size appropriate for fixing or positioning on a part, such as a sheet metal part for fixing pipes in an engine compartment of the vehicle. As shown in FIG. 1, the base panel 100 may have at least two through holes 102. Rivets or screws may pass through the through holes 102 and openings in the part to secure the base panel 100 on that part. In some embodiments, the base panel 100 may be fixed via other means, such as clips, adhesives, or snap fitting structures including recess-protrusion cooperation, and welding. Those means are known to those with ordinary skills in the art, and details thereof will not be described.

In some embodiments, the clamping member 200 may include a flexible part 214 adjacent to the adjusting member 400 or the guiding member 300. In the depicted embodiment, the clamping member 200 may have a first arm 202 and a second arm 204. The second arm 204 may include the flexible part 214. A bottom 207a of the first arm 202 and a bottom 207b of the second arm 204 are connected. In some embodiments, the first arm 202 and the second arm 204 are integrally formed. A top 209 of the first arm 202 and a top 211 of the second arm 204 are spaced apart from each other. The first and second arms 202, 204 may be straight or arc shaped, and define a substantial V-shaped or U-shaped cross section of the clamping member 200. The bottom 207 of the clamping member 200 is coupled on the surface 101 of the base panel 100. Referring to FIG. 1, the top 209 of the first arm 202 and the top 211 of the second arm 204 define a gap 206 for insertion and removal of the pipe (not shown) from the clamping member 200. A space between the first and second arms 202, 204 forms a substantially cylindrical receiving portion 208 for retaining or fixing the pipe. A cross-section area of the receiving portion 208 define a retaining area of the clamping member 200. The second arm 204 may be flexible and may move towards or away from the first arm 202 under an external force, such that the retaining area of the clamping member 200 can be changed.

In some embodiments, the adjusting member 400 is disposed outside a first side 213 of the clamping member 200 or outside the second arm 204 and includes a body 404. The body 404 has a first side 405 adjacent to the second arm 204 and a plurality of retaining portions 406 formed on the first side 405. It should be appreciated that, the term "disposed outside" may mean two elements are spaced apart, or two elements are adjacent and contacted but exclude a condition where one element is completely disposed within the other element. For example, when the adjusting member 400 is disposed outside the second arm 204, the adjusting member 400 is connected with a portion of the second arm 204 but is not completely located in the interior of the second arm 204. In some embodiments, the first side 405 of the adjusting member 400 may be on an inclined plane inclined from a top to a bottom of the body 404. That is, the top of the first side 405 is closer to the clamping member 200 than the bottom is. The retaining portions 406 may include a plurality of recesses recessed from the inclined plane or recessed from the first side 405 and configured to be engaged with a protrusion 205 formed on the second arm 204. The recesses may have substantially similar configurations. For example, each of the recesses may have a substantial same depth D in a lateral direction L. In this way, sidewalls of the recesses are positioned further away from the second arm 204 in the up-down direction. As shown in FIG. 1, the retaining portions 406 includes a lower recess 401 and an upper recess 403 and a top recess 417. The upper recess 403 has a sidewall 407 closer to the second arm 204 than a sidewall 409 of the lower recess 401. Any one of the retaining portions 406 is capable of engaging with the protrusion of the second arm 204. The engagements of the second arm 204 with the recesses 401, 403 and 417 define various different clamping areas. In this way, the retaining device 10 may be used for holding pipes with different diameters.

Referring to FIG. 1, the adjusting member 400 includes a chamber 402 for receiving the guiding member 300. As the adjusting member 400 moves downward, it pushes the second arm 204 to move in a direction shown in arrow A to enable the first and second arms 202, 204 close to each other, such that the cross-section area of the receiving portion 208 decreases or the clamping area of the clamping member 200 decreases. When the adjusting member 400 moves upward, the clamping area of the clamping member 200 increases.

In some embodiments, the first arm 202 may be flexible and may be moveable toward or away from the second arm 204 such that a size of the gap 206 can be further changed when the second arm 204 is engaged with the adjustment member 300 to facilitate the insertion and removal of the pipe in the receiving portion 208. The first and second arms 202, 204 may be integrally formed or integrally molded.

In some embodiments, an inner surface of the first arm 202 (i.e., a surface facing the second arm 204) may have at least one first reinforcement ribs 201. The first reinforcement ribs 201 are positioned parallel to each other and spaced apart evenly. After the pipe has been fixed in the receiving portion 208, the first reinforcement ribs 201 contact with the pipe, which increase a friction contact therebetween, and a retaining strength of the clamping member 200 can be increased.

Similarly, an inner surface of the second arm 204 (i.e., a surface facing the first arm 202) may have at least one second reinforcement ribs 203. The second reinforcement ribs 203 are positioned parallel to each other and spaced apart evenly. After the pipe has been fixed in the receiving portion 208, the second reinforcement ribs 203 contact with the pipe which increase a friction contact therebetween, and a retaining strength of the clamping member 200 can be increased.

In some embodiments, the second arm 204 has a protrusion 205 at its free end. The protrusion 205 may be engaged with any one of the retaining portions 406 of the adjusting member 400, such that the second arm 204 may be fixed on different positions on the adjusting member 400. As the second arm 204 can be deformed to engage with different retaining portions or recesses, 401, 403 and 417, the cross-sectional area or the clamping area of the receiving portion 208 can be changed to accommodate pipes with different diameters.

In some embodiments, the clamping member 200 further includes a connection portion 210 at its bottom 207. The connection portion 210 may be disposed at the bottoms 207a, 207b of the first and second arms 202, 204 and connected with the surface of the base panel 100. With the connection portion 210, a space may be defined between the base panel 100 and the clamping member 200 to provide a space for movements of the first and second arms 202, 204 when they are moving downward the base panel 100. Referring to FIG. 1, the connection portion 210 may be positioned adjacent to an edge of the base panel 100, which facilitates the first arm 202 to move along direction A.

In some embodiments, the retaining device 10 further includes a support rib 212 connected with the connection portion 210 and extended between the clamping member 200 and the base panel 100. The support rib 212 can support the clamping member 200 and enhance the strength of the connection portion.

In some embodiments, the adjusting member 400 may move along the guiding member 300 to push the second arm 204 move toward or away from the first arm 202. Referring to FIG. 1, the guiding member 300 may be a substantially cylindrical bar, and the adjusting member 400 includes a substantially cylindrical chamber 402 with a diameter larger than that of the bar. The guiding member 300 is partially received in the chamber 402 and the adjustment member 400 is moveable upward and downwards along the guiding member 300 under a force.

In some embodiments, the retaining device 10 further includes a barrier block 500 disposed on the surface 101 of the base panel 100 A second side 415 of the adjusting member 400 rests on the barrier block 500. The first side 405 of the adjusting member 400 is engaged with the second arm 204. while the second side 415 opposing the first side 405 is blocked by the barrier block 500. The barrier block 500 can prevent rotation of the adjusting member 400 at a direction B (e.g., rotating clockwise) or a direction opposite the direction B (e.g., rotating counter clockwise) which may lose the engagement of the adjustment member 300 with the second arm 204 can be avoided.

Figure 2:
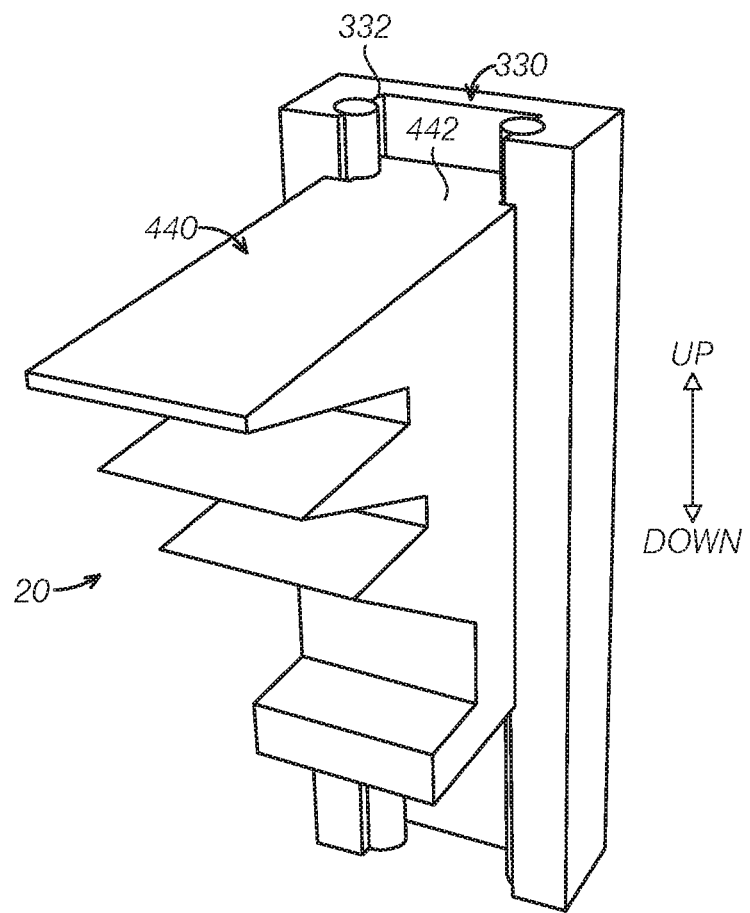
FIG. 2 is a perspective partial view of a pipe retaining device according to another embodiment of the present disclosure, illustrating a guiding member and an adjusting member of the pipe retaining device.

It should be appreciated that, the guiding member of the retaining device 10 in the present disclosure may have other configuration for implementing the same functions of the guiding member 300. FIG. 2 is a perspective view of a portion of another pipe retaining device 20, illustrating a guiding member 330 and an adjusting member 440 of the retaining device 20. For the sake of brevity, parts similar to the pipe retaining device 10 is not described in detail. Other parts of the retaining device 20 may refer to those of the retaining device 10 described above with reference to FIG. 1. Referring to FIGS. 1 and 2, the guiding member 330 may be fixed on a based panel 100 and disposed outside the adjusting member 200. The guiding member 330 includes a slide rail 332. The adjusting member 440 has a first side adjacent to the second arm 204 and a second side opposite to the first side. A slide 442 matched with the slide rail 332 is formed on the second side of the adjusting member 440. The slide 442 is slidable in the slide rail 332, such that the adjusting member 440 is moveable upward and downward along the guiding member 330. Alternatively, a slide is formed on the guiding member 330, a slide rail matched with the slide is formed in the adjusting member 440, and the slide is slidable in the slide rail such that the adjusting member 440 is moveable upward and downward along the guiding member 330. With the adjusting member 440 and the guiding member 330 as shown in FIG. 2, the barrier block 500 illustrated in FIG. 1 can be omitted.

Figure 3:
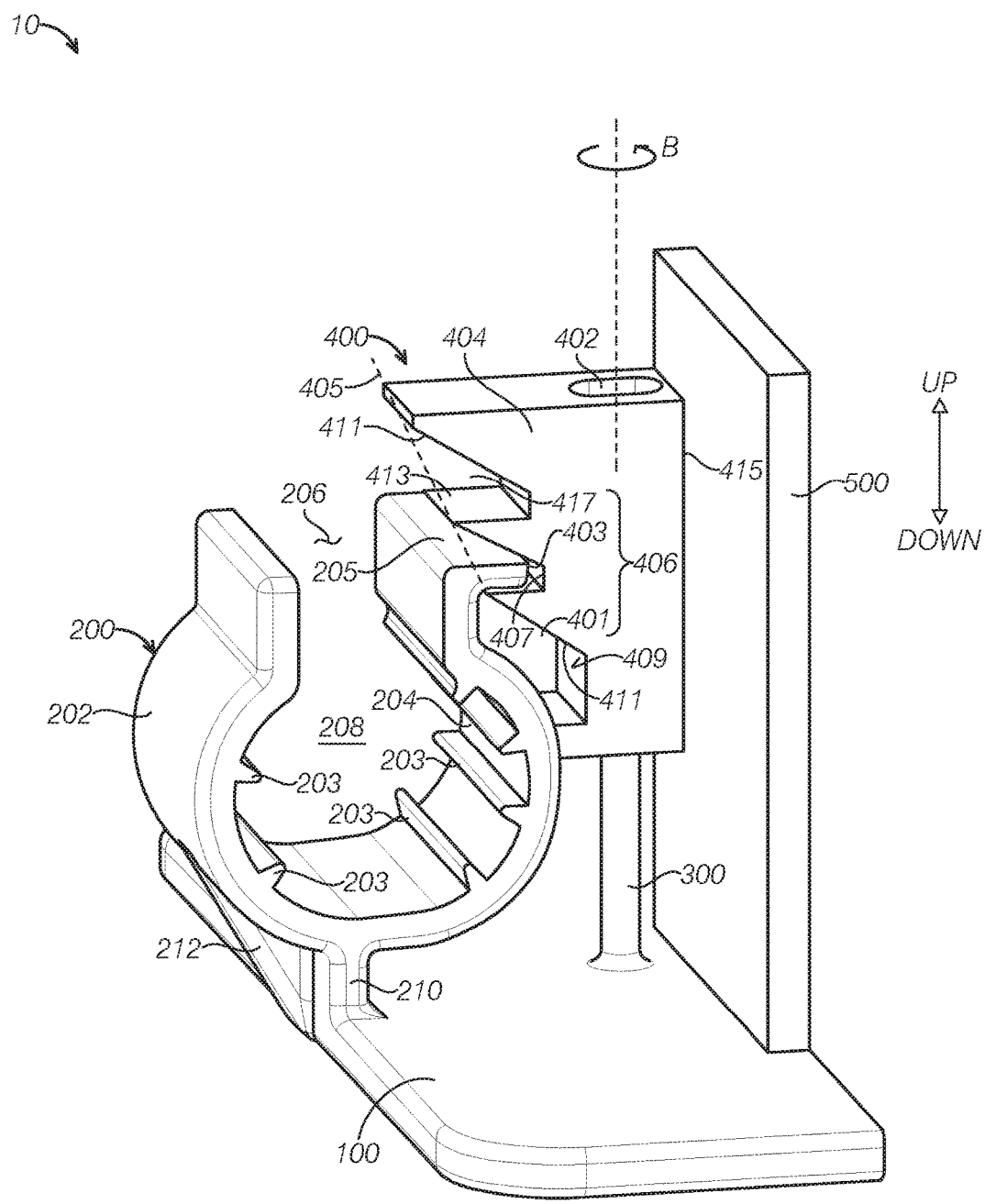
FIG. 3 is a perspective view of the pipe retaining device in FIG. 1, illustrating the pipe retaining device in a second state.

Referring to FIGS. 1 and 3, FIG. 1 illustrates the retaining device 10 in a first state and FIG. 3 illustrates the retaining device 10 in a second state. Referring to FIG. 1, the protrusion 205 of the second arm 204 is engaged with the lower recess 401 in the first state (or an original state). As the adjusting member 400 moves downward along the guiding member 300, the adjusting member 400 pushes the second arm 204 in direction A, forcing the second arm 204 to move towards the first arm 202. As the upper recess moves to a position where the lower recess 401 is originally located in, the second arm 204 tends to return to a normal state, moves away from the first arm 202 and engage with the upper recess 403, as shown in the second state in FIG. 3. As the upper recess 403 is more adjacent to the second arm 204 than the lower recess 401, the second arm 204 is more adjacent to the first arm 202 in the second state than the first state, and the clamping area of the receiving portion 208 in the second state is smaller than the that in the first state.

When the retaining device is used to secure a pipe with a smaller cross-section area, the adjusting member 400 can be pushed downward to deform the second arm 204 to have the protrusion 205 of the second arm 204 engaged with an upper recess after the pipe is placed into the receiving portion 208. In this way, the clamping area of the receiving portion 208 can be decreased to fix the pipe properly. As described, the pipe retaining device of the present disclosure can secure pipes with various different diameters. Because of the gap at the tops of the first and second arm of the retaining device, it is easy to insert and remove the pipe from the retaining device.

Similarly, the clamping area of the receiving portion 208 may be increased to secure pipes with larger diameters. Referring to FIG. 3 and FIG. 1, as the adjusting member 400 moves upward along the guiding member 300, the protrusion 205 may be deformed to change from engaging with the upper recess 403 as shown in FIG. 3 to engaging with the lower recess 401 as shown in FIG. 1 at a same height. As the lower recess 401 is further away from the second arm 204 than the upper recess 403, the second arm 204 is further away from the first arm 202 in the first state than the second state such that the clamping area of the receiving portion 208 is larger in the first state than in the second state.

When the retaining device is used to secure a pipe with a larger diameter, the adjusting member 400 can be pulled upward to enable the protrusion 205 engage with a lower recess and the second arm 204 moves away from the first arm 202. In this way, the clamping area or retaining area of the receiving portion 208 is increased to accommodate the pipe having a relative larger diameter.

In some embodiments, each of the retaining portions 406 or the recesses 401, 403 and 417 that contacts with the protrusion 205 may have a first inclined top wall 411. The first inclined wall 411 is sloped in a first direction consistent with the inclined plane or inclined first side 405 of the adjusting member 400 to facilitate the release of the protrusion 205 from a current recess during downward movement of the adjusting member 400. For example, in the first state as shown in FIG. 3, the protrusion 205 moves upward by sliding along the first inclined top wall 411 at the top of the lower recess 401 and is released from the lower recess 401. Similarly, some of the retaining portions 406 may have a second inclined bottom wall 413 sloped in a second direction opposing the first direction to facilitate the downward movement of the protrusion 205.

Figure 4B:
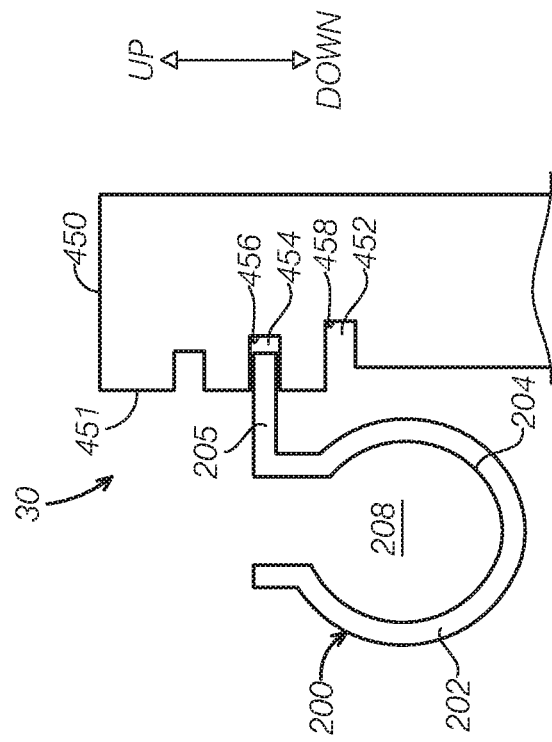
FIGS. 4A and 4B are perspective views of a pipe retaining device according to another embodiment of the present disclosure, illustrating the pipe retaining device in a first state and second state, respectively.
Figure 4A:
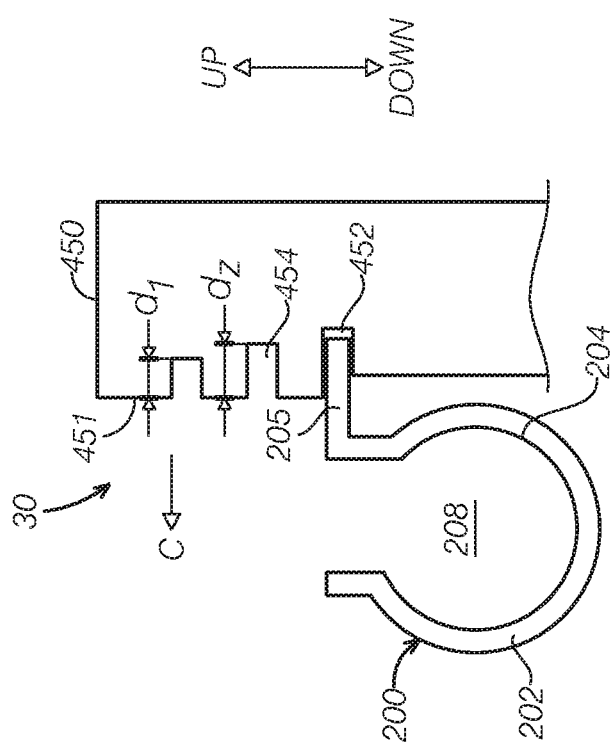

FIGS. 4A and 4B illustrate perspective views of another pipe retaining device 30 according to another embodiment of the present disclosure. Except for an adjusting member generally depicted by number 450, other parts may refer to those described with references to FIGS. 1-3. Referring to FIGS. 4A and 4B, a side 451 of the adjusting member 450 to be engaged with the second arm 204 is substantially upright or vertical, and a plurality of recesses 452, 454 to be engaged with the protrusion 205 of the second arm 204 are formed on the side 451 or recessed from the side 451 of the adjusting member 450. The recesses include a lower recess 452 and an upper recess 454. The upper recess 454 has a sidewall 456 more adjacent to the second arm 204 than a sidewall 458 of the lower recess 452.

In a first state as shown in FIG. 4A, the protrusion 205 is fitted or received in the lower recess 452. When the adjusting member 450 is pushed to move downward, a downward force applied on the second arm 204 may cause the second arm 204 to move in a direction C, and the protrusion 205 is released from the lower recess 452. As the upper recess 454 moves downward to the position where the lower recess 452 was originally located, the second arm 204 tends to return to a normal state and moves into the upper recess 454 as shown in a second state in FIG. 4B.

As the protrusion 205 of the second arm 204 substantially are located at a same height in both the first and second states and the sidewall 456 of the upper recess 454 is closer to the second arm 204 than the sidewall 458 of the lower recess 452, the second arm 204 is more adjacent to the first arm 202 in the second state than in the first state. Thus, the receiving portion 208 defined by the first and second arms 202, 204 may have a clamping area smaller in the second state than that in the first state. In this way, if the retaining device 30 is used to secure a pipe having a relative smaller diameter, the adjusting member 450 can be pushed to move downward to decrease the clamping area of the receiving portion to hold the pipe stably after the pipe is placed in the receiving portion 208.

If the retaining device is used to secure a pipe with a larger diameter, the adjusting member is pulled to move upward. The second arm is changed from engaging with the upper recess in the second state as shown in FIG. 4B to engaging with the lower recess in the first state as shown in FIG. 4A and located further away from the first arm to increase the clamping area.

Figure 5:
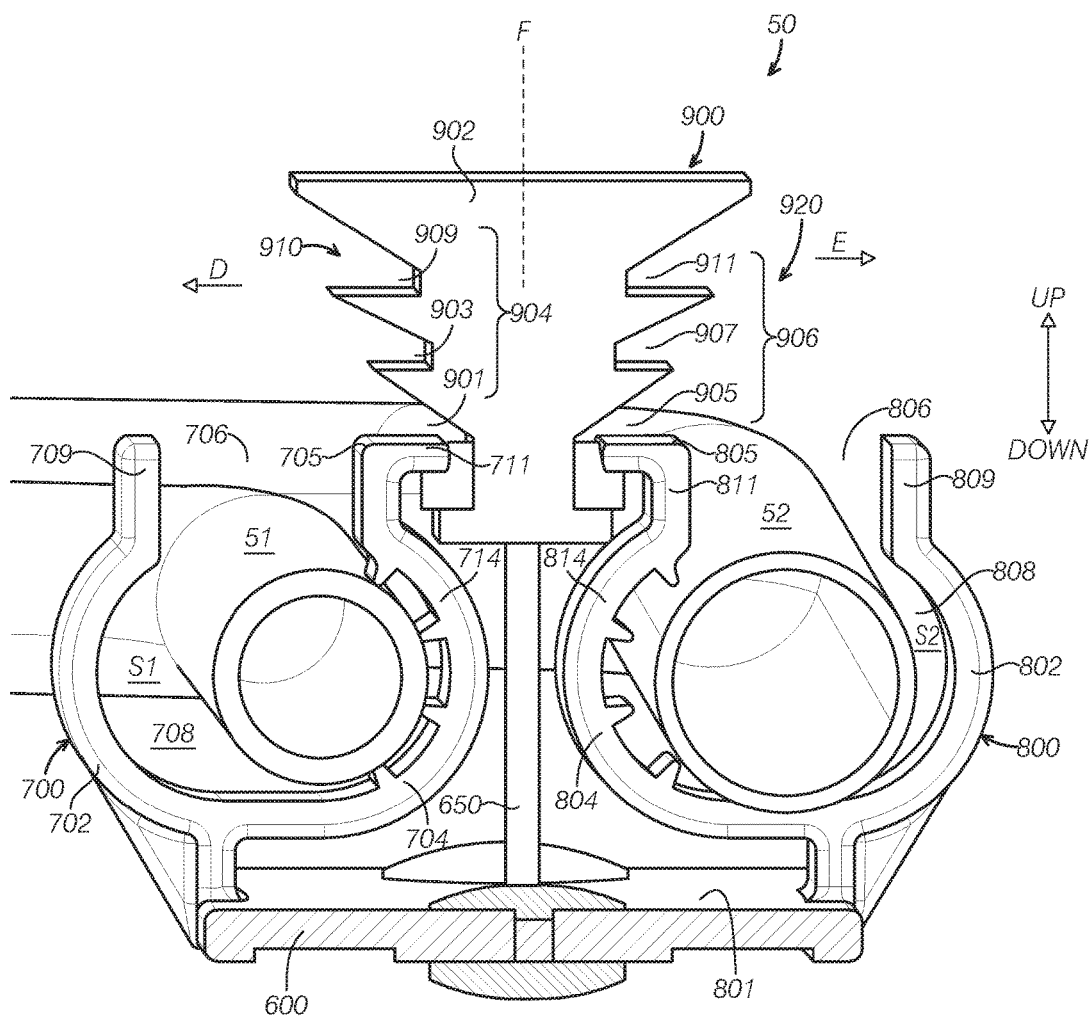
FIG. 5 is a perspective view of a pipe retaining device according to another embodiment of the present disclosure, illustrating the pipe retaining device in a first state.
Figure 6:
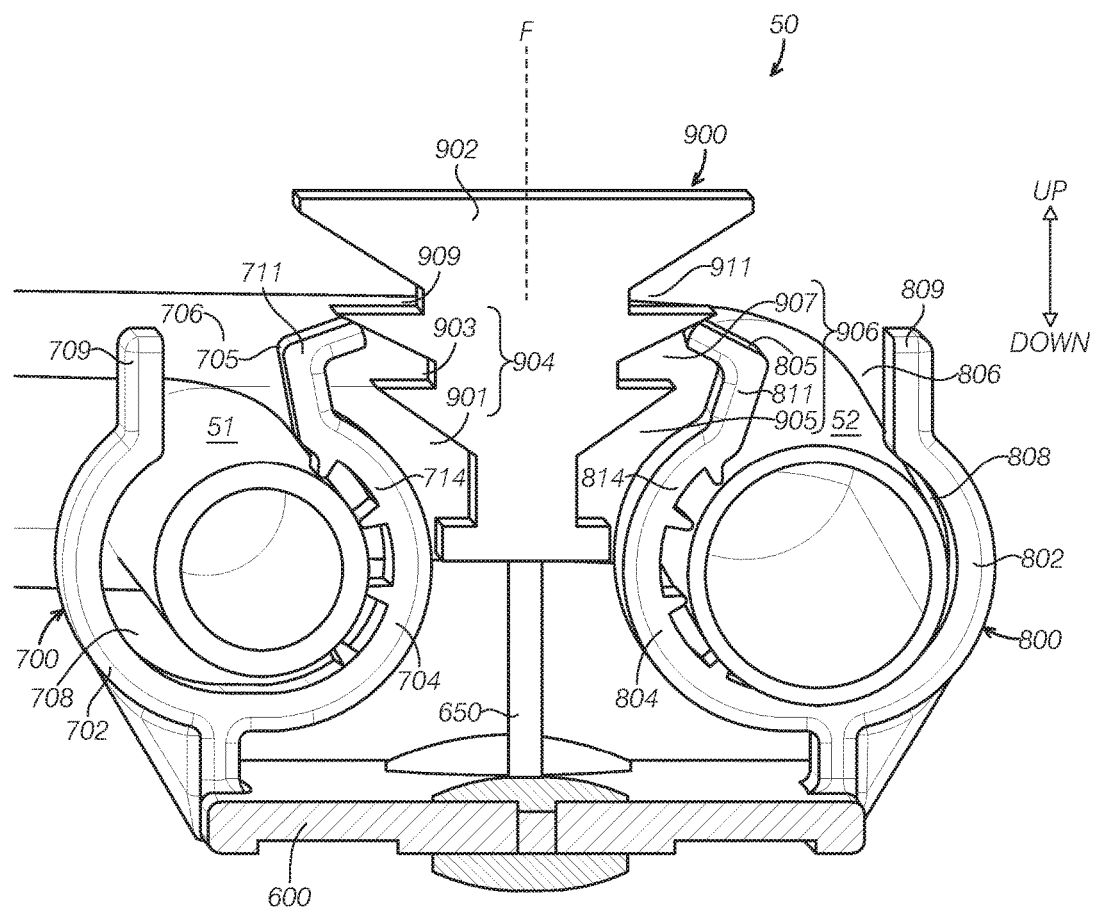
FIG. 6 is a perspective view of the pipe retaining device in FIG. 5, illustrating the pipe retaining device in a second state.

Although the retaining device is illustrated to have one clamping member and one adjusting member in FIGS. 1-3 and 4A-4B, various embodiments are possible. For example, the retaining device may include more than one clamping member and more than one side of the adjusting member may retaining portions. FIGS. 5 and 6 are a perspective view of a pipe retaining device 50 or retaining device 50 according to another embodiment of the present disclosure. The retaining device 50 includes two clamping members 700, 800 spaced apart and a guiding member 900 is disposed therebetween. Two opposite sides of the adjusting member 900 have a plurality of retaining portions to be engaged with corresponding clamping arms 700, 800, respective to adjust clamping areas of the clamping members 700, 800.

Referring to FIG. 5, the retaining device 50 includes a base panel 600, a first clamping member 700 and a second clamping member 800 disposed on a surface 801 of the base panel 600 and spaced apart from each other, an adjusting member 900 disposed between the first and second clamping members 700, 800, and a guiding member 650 disposed on the surface of the base panel 600 and engaged with the first and second clamping members 700, 800. The adjusting member 900 is moveable along the guiding member 650.

In some embodiments, the first clamping member 700 may include a flexible part 714 disposed adjacent to the adjusting member 900. In the depicted embodiment, the first clamping member 700 has a first arm 702 and a second arm 704 including the flexible part 714 or the flexible second arm 704. The first arm 702 and the second arm 704 may be integrally formed. A top 709 of the first clamping member 700 and a top 711 of the second clamping member 800 are spaced apart to create a gap 706 for insertion and removal of a first pipe 51, and a space S1 between the first and second arms 702, 704 form a first receiving portion 708 for retaining or holding the first pipe 51. The first receiving portion 708 may have a substantially cylindrical shape. A first cross-sectional area of the receiving portion 708 may define a first clamping area of the first clamping member 700.

In some embodiments, the first clamping member 700 may include a flexible part 814 disposed adjacent to the adjusting member 900. In the depicted embodiment, the second clamping member 800 has a third arm 802 and a fourth arm 804 including the flexible part 814 or the flexible further arm 804. The third arm 802 and the fourth arm 804 may be integrally formed. A top 809 of the third arm 802 and a top 811 of the fourth arm 804 are spaced apart to create a gap 806 for insertion and removal of a second pipe 52, and a space S2 between the third and fourth arms 802, 804 form a substantially cylindrical second receiving portion 808 for retaining or holding the second pipe 52. The second cross-sectional area of the second receiving portion 808 may define a second clamping area of the second clamping member 800.

The first clamping member 700 and the second clamping member may have the same size or different size. That is, the dimension of the first receiving portion 708 of the first clamping member 700 may be the same as or different from the second receiving portion 808 of the second clamping member 800.

In some embodiments, as the adjusting member 900 moves along the guiding member 650, the second arm 704 is capable of engaging with a different first retaining portion 904 of the adjusting member 900 such that the first clamping area of the first clamping member 700 can be different or variable. The fourth arm 804 is capable of engaging with a different second retaining portion 906 of the adjusting member 900 such that the second clamping area of the second clamping member 800 can be different or variable.

In some embodiments, the adjusting member 900 is disposed between the second and fourth arms 704, 804. The adjusting member 900 includes a body 902 having a first side 910 and a second side 920 opposite to the first side 910, a plurality of first retaining portions 904 formed at the first side 910, and a plurality of second retaining portions 906 formed at the second side 920. Any one of the first retaining portions 904 may be engaged with the second arm 704, and any one of the second retaining portions 906 may be engaged with the fourth arm 804.

In some embodiments, the first retaining portions 904 includes a first lower recess 901, a first upper recess 903 and a first top recess 909. The second arm 704 has a first protrusion 705 formed at one free end. The second retaining portions 906 includes a second lower recess 905, a second upper recess 907 and a second top recess 911. The fourth arm 804 has a second protrusion 805 formed at one free end.

In a first state shown in FIG. 5, the first protrusion 705 of the second arm 704 is engaged with a first lower recess 901, and the second protrusion 805 of the fourth arm 804 is engaged with a second lower recess 905. When the adjusting member 900 moves downward along the guiding member 650, the second arm 704 is pushed to move towards the first arm 702 in a direction D and the fourth arm 804 is pushed to move toward the third arm 802 in a direction E. When the first and second upper recesses 903, 907 move to positions of the first and second protrusions 705, 805 of the second and fourth arms 704, 804, respectively, the second and fourth arms 704, 804 tends to return to normal states and the first and second protrusions 705, 805 moves into the first and second upper recesses 903, 907 respectively, as shown in the second state in FIG. 6.

Referring to the embodiments described above, the first lower and upper recess 901, 903 are configured such that the first receiving portion 708 has a smaller clamping area or retaining area when the first protrusion 705 is received in the upper recess 903 in the second state shown in FIG. 6 than that when the protrusion 705 is received in the lower recess 901 in the first state shown in FIG. 5. The second lower and upper recess 905, 907 are configured such that the second receiving portion 808 has a smaller clamping area or retaining area when the second protrusion 805 is received in the upper recess 907 in the second state shown in FIG. 6 than that when the second protrusion 805 is received in the lower recess 905 in the first state shown in FIG. 5.

On the contrary, the upward movement of the adjustment member 900 from the second state shown in FIG. 6 to the first state shown in FIG. 5 can increase the cross-section areas of the first and second receiving portions 708, 808 (i.e. the clamping areas of the first and second clamping members 700, 800). Operations of related other members may refer to those described in the above embodiments and will not described.

It should be appreciated that the structure of the first clamping member 700 may refer to the clamping member 200 shown in FIG. 1, and the second clamping member 800 is symmetrical to the first clamping member 700 about a longitudinal centre axis F of the adjusting member 900. The first and second sides of adjusting member 900 are symmetrical about axis F, i.e., the first and second retaining portions 904, 906 are symmetrical about the axis F. Other structures of the first and second clamping members 700, 800 and the adjusting member 900 may refer to the clamping member 200 shown in FIG. 1. It should be appreciated that, the adjusting member and the guiding member of the pipe retaining device are not limited to those shown in FIGS. 5 and 6. Further the pipe retaining device 50 may use the guiding member shown in FIG. 2 and the adjusting member shown in FIG. 4.

The pipe retaining devices of the present disclosure have various advantages. For example, it is easy to insert a pipe and remove the pipe from the pipe retaining devices. Further, the pipe retaining devices can be used for securing pipes with different diameters.

The pipe retaining devices of the present disclosure may be used in a passenger vehicle, a commercial vehicle, or various other vehicles, such as agriculture machines, transportation ships, or airplanes. Those applications should be considered as included in the scope of term "vehicle" cited in this disclosure.

It should be appreciated that the embodiments described above are specific examples that do not encompass all possible forms of the disclosure. The features of the illustrated embodiments may be combined to form additional or alternative embodiments of the disclosed concepts. The words used in the specification are words of description rather than limitation, and it is understood that changes can be made without departing from the spirit and scope of the disclosure. The scope of the following claims is broader than the specifically disclosed embodiments and includes modifications of the illustrated embodiments.

The invention claimed is:

1. A pipe retaining device, comprising:
a base panel;
a clamping member coupled to the base panel and including a flexible part;
an adjusting member disposed outside and adjacent to the flexible part, and coupled to the base panel, wherein the adjusting member includes a body and a plurality of retaining portions formed on a first side of the body; and a guiding member disposed on a surface of the base panel and connected with the adjusting member,
wherein the plurality of retaining portions are disposed along a lengthwise direction of the guiding member and the adjusting member is moveable such that the flexible part is able to be released from an engagement with the one of the retaining portions and engage with another one of the retaining portions when the adjustment member moves upward or downward along the guiding member, and
wherein the clamping member includes a first arm and a second arm having the flexible part, and wherein a top of the first arm and a top of the second arm are spaced apart to create a gap for insertion and removal of a pipe, and the first and second arms define a substantial cylindrical shaped receiving portion to secure the pipe.

2. The pipe retaining device of claim 1, wherein the retaining portions of the adjusting member include a lower recess and an upper recess, wherein the second arm has a protrusion at a free end thereof to be engaged in the lower recess or the upper recess, and wherein the adjusting member is configured to move downward along the guiding member such that the second arm moves towards the first arm and the protrusion of the second arm is released from the lower recess and engaged with the upper recess to decrease a cross-sectional area of the receiving portion.

3. The pipe retaining device of claim 2, wherein the adjusting member is further configured to move upward along the guiding member such that the second arm moves away from the first arm and the protrusion of the second arm is released from the upper recess and engaged with the lower recess to increase the cross-sectional area of the receiving portion.

4. The pipe retaining device of claim 2, wherein the first side of the body is substantial vertical to the surface of the base panel, and the upper recess has a depth smaller than that of the lower recess.

5. The pipe retaining device of claim 2, wherein the first side of the body is configured to have an inclined surface and spaced further away from the second arm in an up to down direction, the upper recess has a depth substantially the same as that of the lower recess, and an opening of the upper recess is closer to the protrusion of the second arm than an opening of the lower recess.

6. The pipe retaining device of claim 1, wherein the first arm is flexible and integrally molded with the second arms.

7. The pipe retaining device of claim 1, wherein the first arm includes at least one first reinforcement rib at its inner surface or the second arm includes at least one second reinforcement rib at its inner surface.

8. The pipe retaining device of claim 1, further comprising a connection portion disposed below the first or second arm to connect with the surface of the base panel.

9. The pipe retaining device of claim 8, further comprising a support rib connected with the connection portion and extending between the clamping member and the base panel.

10. The pipe retaining device of claim 1, wherein the guiding member is configured to have a substantial cylindrical bar shape, the adjusting member includes a substantial cylindrical chamber to receive the guiding member such that the adjusting member is able to move upward or downward along the bar under a force.

11. The pipe retaining device of claim 10, further comprising a barrier block disposed on the surface of the base panel, and a second side of the body of the adjusting member opposite to the first side rests on a surface of the barrier block.

12. The pipe retaining device of claim 11, wherein the barrier block includes a slide rail on the surface, the adjusting member includes a slide at the second side, and the slide is moveable along the side rail under the force.

13. A pipe retaining device, comprising:
- a base panel;
- a first clamping member and a second clamping member, wherein the first clamping member includes a first clamping arm, a second clamping arm having a first flexible part and the second clamping member includes a third clamping arm and a fourth clamping arm having a second flexible part, wherein the first clamping member and the second clamping member are disposed on a surface of the base panel and spaced apart with each other;
- an adjusting member disposed between the first flexible part and the second flexible part, wherein the adjusting member includes a plurality of first retaining portions formed in a first side of a body, and a plurality of second retaining portions formed in a second side of the body; wherein an engagement between one of the first retaining portions and the first flexible part defines a first cross-sectional area of the first clamping member, and an engagement between one of the second retaining portions and the second flexible part defines a second cross-sectional area of the second clamping member; and
- a guiding member disposed on the surface of the base panel and moveably connected with the adjusting member, wherein the first flexible part of the first clamping member changes the engagement with one of the first retaining portions of the adjusting member while the second flexible part of the second clamping member changes the engagement with one of the second retaining portions as the adjusting member moves along the guiding member,
- wherein the plurality of the first retaining portions comprises a first lower recess and a first upper recess, a free end of the second clamping arm includes a first protrusion; wherein the adjusting member is configured to move downward or upward along the guiding member to enable an engagement of the first protrusion with the first upper recess or the first lower recess, respectively, to vary the first cross-sectional area, and
- wherein the plurality of second retaining portions comprises a second lower recess and a second upper recess, a free end of the fourth clamping arm includes a second protrusion; and the adjusting member is configured to move downward or upward along the guiding member to enable an engagement of the second protrusion with the second lower recess or the second upper recess, respectively, to vary the second cross-sectional area.

14. The pipe retaining device of claim 13, wherein a top of the first clamping arm and a top of the second clamping arm are spaced apart, and a space between the first and second clamping arms defines a first receiving portion to receive a first pipe, and wherein a top of the third clamping arm and a top of the fourth clamping arm are spaced apart, and a space between the third and fourth clamping arms defines a second receiving portion to receive a second pipe.

15. A pipe retaining device, comprising:
- a base panel;
- a clamping member having a gap for insertion and removal of a pipe, a receiving portion having a variable cross-sectional area, and the clamping member is coupled with the base panel;
- an adjusting member disposed outside a first side of the clamping member and having a first recess and a second recess formed on one side of a body, wherein the second recess has an edge more adjacent to the first side of the clamping member than an edge of the first recess; and
- a guiding member disposed on the base panel and coupled with the adjusting member,
- wherein the first recess and the second recess are disposed along a lengthwise direction of the guiding member, the adjusting member is moveable along the guiding member and an end of the clamping member contacts with the first recess or the second recess to define a first cross-sectional area or a second cross section cross-sectional area selected from the variable cross-sectional area when the adjusting member moves upward or downward.

16. The pipe retaining of claim 15, wherein the first side of the clamping member includes a flexible part adjacent to the adjusting member and has a curved shape, and wherein a side of the body of the adjustment member has an inclined surface to guide the movement of the adjustment member relative to the clamping member.

17. The pipe retaining device of claim 15, wherein the adjusting member further comprises a third recess having an edge more adjacent to the clamping member than the second recess.

* * * * *